United States Patent Office 3,346,574
Patented Oct. 10, 1967

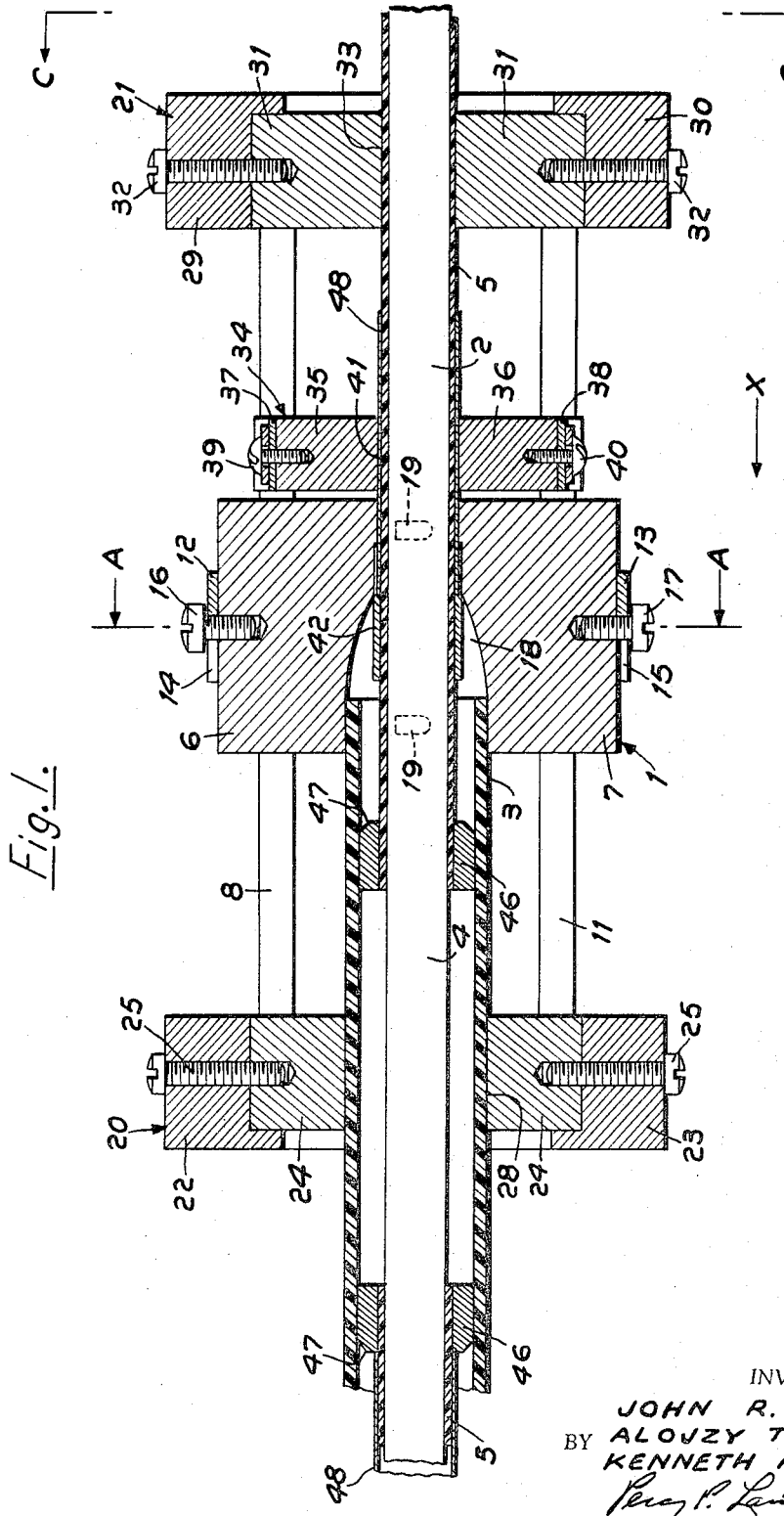

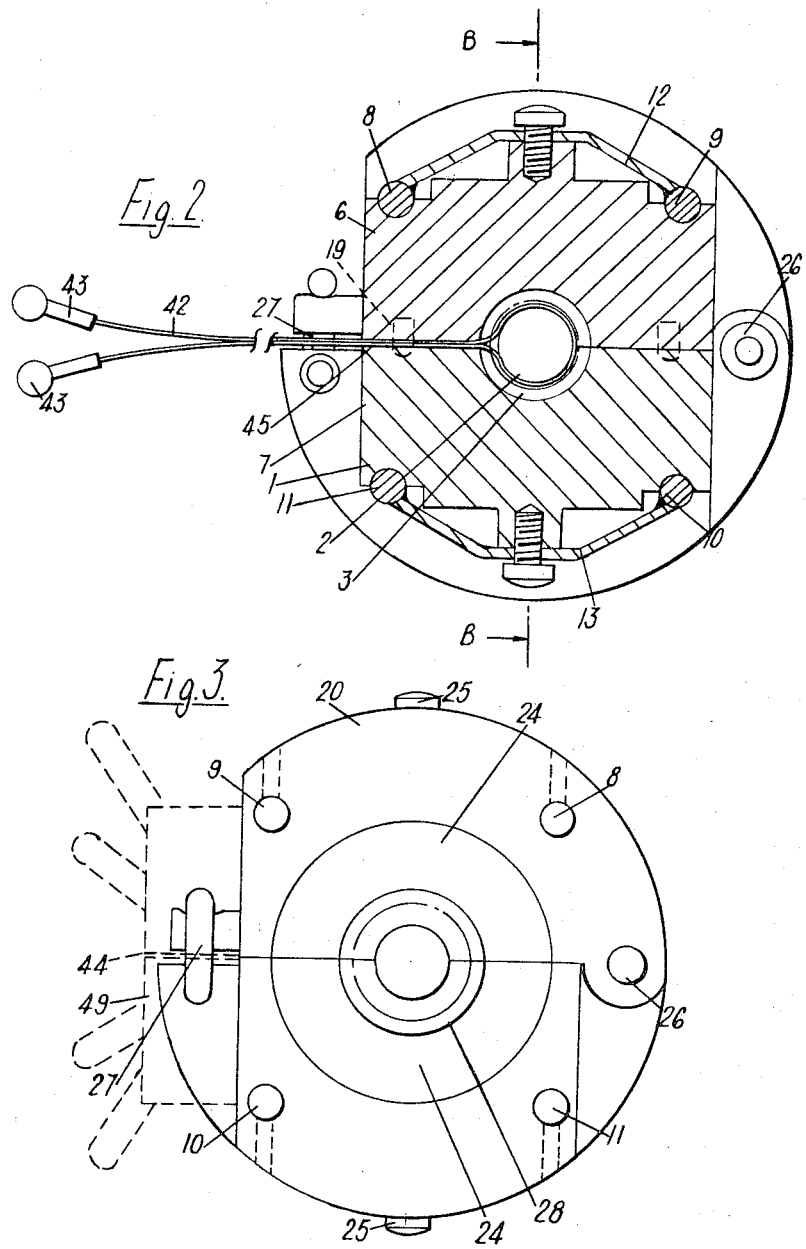

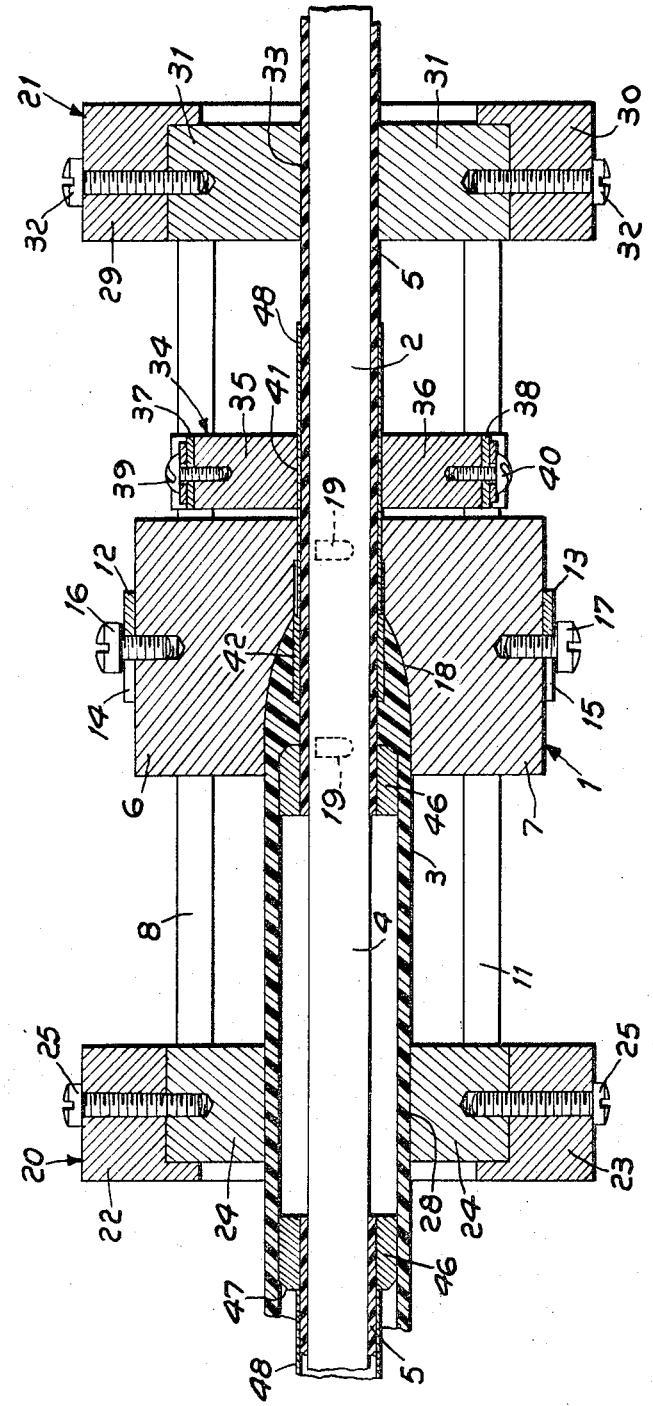

3,346,574
JOINTING PLASTIC MATERIALS
John Richard Eyre, Alojzy Tomica, and Kenneth Richard Way, London, England, assignors to International Standard Electric Corporation, New York, N.Y., a corporation of Delaware
Filed July 9, 1963, Ser. No. 293,714
Claims priority, application Great Britain, July 20, 1962, 28,063/62
6 Claims. (Cl. 264—248)

ABSTRACT OF THE DISCLOSURE

Plastic members are joined by heating and melting overlapping ends in a mold and agitating the adjacent surfaces to facilitate fusion. Upon cooling, the members solidify in the shape of the mould.

This invention relates to a method for jointing plastic materials.

According to the present invention a method of jointing plastic materials includes the step of agitating the surfaces to be joined by means of a member interposed between them.

In the accompanying drawings which illustrate an embodiment of the present invention, for jointing polythene tubings, FIG. 1 is a section side view along B—B in FIG. 2 of an embodiment of the present invention at the start of a process for jointing the polythene sheath of an electrical cable with a polythene jointing tube.

FIG. 2 is a sectional end view along A—A in FIG. 1,

FIG. 3 is an end view in the direction of arrow C, FIG. 1, with a water cooling jacket shown dotted, and FIG. 4 is a view similar to that of FIG. 1, at the end of the operation.

Referring now to FIGS. 1 and 2 a mould generally indicated by 1 is shown round a polythene sheathed cable 2 for moulding a polythene jointing tube 3 to seal a portion 4 of cable 2 from which the polythene sheath 5 has been removed.

Collars 46 built up from paper strip are wound onto the polythene sheath 5 of the cable 2 and have a chamfer 47. A portion of the polythene sheath 5 adjacent to the predetermined moulding area is covered with a helical winding of aluminium tape 48, for the protection of the polythene sheaths. The ends of the aluminium tape are secured to the polythene sheath by an adhesive tape.

The mould 1 is in two parts 6 and 7 which are secured between two pairs of rails 8, 9 and 10, 11. The pairs of rails 8, 9 and 10, 11 have bridges 12 and 13 secured to them which contain slots 14 and 15. In the slots 14 and 15 are bolts 16 and 17 which can slide out of the slots 14 and 15 in the left hand direction (FIG. 1) to release the mould parts 6 and 7. When the mould parts 6 and 7 are placed together as shown in FIGS. 1 and 2 with locating pins 19 in part 6 located in corresponding holes in part 7 they form a "bottle-neck" shaped moulding surface 18 which is a sliding fit with the polythene tube 3 at the left hand end (FIG. 1) and a clearance fit with the aluminium tape 48 on the polythene sheath 5 at the right hand end.

The mould parts 6 and 7 when placed together form a slot 45 which has a loop of metal tape 42 slidable in it. The loop of metal tape 42 has handles 43 fixed to its end, one of the handles being removable so that the metal tape 42 may be threaded through the slot 45 as shown.

The pairs of rails 8, 9 and 10, 11 are secured at their ends to guides 20 and 21. The guide 20 is in two parts 22 and 23 which have lining halves 24 secured in them by screws 25. The two parts 22 and 23 are hinged together at 26 and may be latched together at 27. When the guide parts 22 and 23 are latched together the bore 28 of the lining halves 24 is a sliding fit with the outside diameter of the polythene tube 3.

The guide 21 is also in two parts 29 and 30 having lining halves 31 secured in them by screws 32. The two parts 29 and 30 are also hinged and latched in the same manner as parts 22 and 23 when they are latched together the bore 33 of lining halves 31 is a sliding fit with the polythene sheath 5.

A follower 34 is made in two parts 35 and 36 of a material of low heat conductivity such as metal loaded resin or nylon which is secured to the pairs of rails 8, 9, and 10, 11 by brackets 37 and 38 and screws 39 and 40 fitted with washers. The follower 34 has a bore 41 which is a sliding fit with the aluminium tape 48 on the polythene sheath 5 and is intended to restrict the flow of molten polythene from the right-hand end of the mould 1 and ensure a smooth finish on the sheath 5.

Referring now to FIG. 3, where like parts have the same reference numerals as FIGS. 1 and 2, the loop of metal tape 42 has been omitted for clarity and water cooling blocks 44 and 49 (dotted) are shown attached to the side of the mould 1.

In operation collars 46 of paper strip are wound on the polythene sheaths 5, aluminium tapes 48 are wound round the sheaths 5 and the polythene tube 3, previously placed over one polythene sheathed cable 2, is drawn over the joint, in the cable core to cover the portion 4 from which the polythene sheaths 5 have been removed for jointing. The mould 1 having the water cooling blocks 44 and 49 on it is removed from the guide rails 8, 9, 10 and 11 and bridges 12 and 13, is heated to its moulding temperature and re-assembled. The assembly is then placed round a polythene sheathed cable 2 and a polythene tube 3 with the tape 42 in position as shown in FIGS. 1 and 2 except that the end of the polythene tube 3 is only located in the larger portion of the bore of the "bottle-neck" shaped moulding surface 18. With the polythene sheathed cable 2 and the polythene tube 3 held stationary the mould 1, guides 20 and 21, follower 34 and tape 42 are moved along the polythene sheathed cable 2 in the direction of arrow X, FIG. 1, to the position shown in FIG. 4, so that the end of the polythene tube 3 is heated and moulded to fill the cavity formed by the "bottle-neck" shaped moulding surface 18, the polythene sheath 5 and the collar 46.

When the end of the polythene tube 3 has been moulded in the mould 1 the handles 43 are alternately pulled to cause the metal tape 42 to move to and fro around the polythene sheath 5 underneath the moulded portion of the polythene tube 3. The metal tape 42 is heated by the mould 1 and transfers heat to the polythene sheath 5 as it is pulled round it so that the outer surface of the polythene sheath 5 is melted. The to and fro movement of the metal tape 42 also mixes some of the outer portion of the polythene sheath 5 with the portion of the polythene tube 3 which is moulded. The complete mould assembly is now rotated through 180° and the operation of pulling the tape 42 to and fro repeated to ensure that the interferface between the sheath 5 and the tube 3 is treated around the whole circumference. When the whole of the outer surface of the polythene sheath 5 has been treated so that fusion will occur between it and the moulded portion of the polythene tube 3 the metal strip 42 is removed from the mould 1 by releasing one of the handles 43.

A portion of the oxidised polythene on the surface of the polythene sheath 5 becomes trapped by the to and fro motion of the tape 42 in the V formed where the tape 42 leaves the mould and this oxidised polythene is removed by removing the lower handle 43 (FIG. 2) and pulling the upper handle 43 whilst the mould is rotated in the same anti-clockwise direction as that which the tape 42 is being removed from around the polythene sheath 5. By removing the tape 42 in this manner this oxidised polythene sticks to it and is withdrawn with the tape 42. If the polythene tube 3 is of a different coloured polythene from that of the polythene sheath 5 then the polythene removed from the sheath 5 by the tape 42 will be found to be mixed with polythene having the colour of the polythene tube 3 as proof of the extent of the mixing which occurs between the moulded portion of the polythene tube 3 and the polythene sheath 5. The water cooling blocks 44 and 49 then have cooling water circulated through them to cool the mould 1 and solidify the moulded end of the polythene tube 3 so that is fuses with the polythene sheath 5. When the mould 1 has cooled the latches 27 are released and the mould 1 removed from the polythene sheathed cable 1.

The mould 1 is again placed on the polythene sheathed cable with the mould 1 in position to seal the other end of the polythene tube 3 and this end is sealed in the same manner.

If desired the metal strip 42 may be heated electrically.

The invention may also be used for sealing a plastic end cap to a plastic sheathed cable.

What we claim is:

1. A method of jointing plastic members including mounting first and second plastic members in a mould adjacent one another with one overlapping the other, heating the mould to melt one end of said one member and forming it against and melting said other member, agitating the adjacent surface of said other member within said mould to facilitate fusion with said one end, removing the agitation to permit the ends to fuse, and removing the heat to permit the ends to cool and solidify in the shape of the mould.

2. The method of claim 1 including mounting a third member adjacent said first member with said second member intermediate and overlapping the others, heating and melting one end of the intermediate member in said mould and forming it against and melting the first member, heating and agitating the adjacent surface of said first member within said mould to facilitate fusion with said one end of said intermediate member, heating and melting the other end of said intermediate member in said mould and forming it against and melting said third member, and heating and agitating the adjacent surface of said third member within said mould to facilitate fusion with said other end of said intermediate member.

3. The method of claim 2 wherein said first and third plastic members are in the form of cable insulators and said intermediate member is in the form of a tube having ends overlapping said first and third members and one end mounted in said mould, mounting a flexible tape within said mould around said first member, heating the mould to melt and form said intermediate member around said first member and melt said first member, heating and agitating the tape against the adjacent surface of said first member to facilitate fusion of said surface with said one end of said intermediate member, removing the tape to permit fusion, removing said fused end from said mould and mounting the other end of said intermediate member around said third member in a mould, mounting said metal tape within said mould around said third member, heating the mould to melt and form the other end of said intermediate member around said third member and melt said third member, heating and agitating the tape against the adjacent surface of said third member to facilitate fusion of the surface thereof with said other end of said intermediate member, removing the tape to permit the fusion and removing the heat to permit the ends to cool and solidify in the shape of the mould.

4. The method of claim 3 including moving said tape in a reciprocal motion along a path between the adjacent surfaces.

5. The method of claim 3 including moving said heated mould along the longitudinal axis of said intermediate member around said first and third members.

6. The method of claim 3 including rotating said mould 180° at each end of said intermediate member and agitating the tape at each end to facilitate fusion of the whole circumference of said adjacent surfaces.

References Cited

UNITED STATES PATENTS

| 1,985,997 | 1/1935 | Keeran | 264—248 X |
| 2,249,510 | 7/1941 | Welker | 264—248 X |
| 2,695,853 | 11/1954 | Foreit | 264—248 X |

FOREIGN PATENTS

| 1,185,918 | 8/1959 | France. |
| 1,323,335 | 2/1963 | France. |

ROBERT F. WHITE, *Primary Examiner.*

ALEXANDER H. BRODMERKEL, *Examiner.*

L. S. SQUIRES, A. R. NOE, *Assistant Examiners.*